April 1, 1969
L. MALE
FLUID REGULATOR VALVE
Filed March 13, 1967
3,435,850
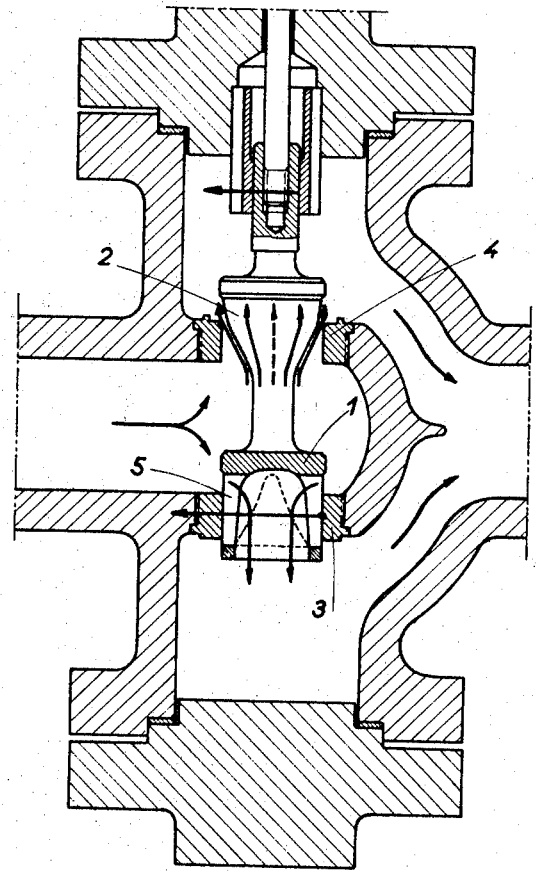

# United States Patent Office 3,435,850
Patented Apr. 1, 1969

3,435,850
FLUID REGULATOR VALVE
Lucien Male, Meudon, France, assignor to ARCA Premoncontrole, Gentilly, France, a company of France
Filed Mar. 13, 1967, Ser. No. 622,563
Claims priority, application France, Mar. 21, 1966, 54,308
Int. Cl. F16k 1/54, 1/12
U.S. Cl. 137—625.34   1 Claim

ABSTRACT OF THE DISCLOSURE

A valve to control a single fluid flow which comprises first and second coaxial basic valves fast with one another cooperating respectively with first and second seats, the first valve having a V aperture and the first seat being a figure of revolution while the second valve is parabolic, the axis of the valves being normal to inlet flow.

---

The invention relates to a fluid regulator valve which is intended in particular for regulating fluids at high static pressure and/or at high differential pressure.

Sluices comprising a parabolic valve have already been used. These sluices free the seats at the instant when the valves open, and the latter receive a thrust on their central portion, and behave as girders resting at both ends. A valve of this type exhibits the disadvantage of oscillating within its elastic limits until there is a more or less long-term fatigue fracture in the metal. On the contrary, this type of valve throttles the fluid in a well-distributed circular fashion.

V-shaped valves resting on seats have like-wise been used, the fluid passing via those parts of the V of the seats which are freed. These valves are of a generally cylindrical shape, and slide in a bore terminating in the corresponding seat, the V of each valve being disposed in the cylindrical portion. Experience has shown that V-shaped valves are well supported in their seats, and undergo virtually no oscillation. On the contrary, flow via the V's takes place in the form of jets which exhibit poor flow characteristics and erode the body.

The invention overcomes the disadvantages of the two types of valves which have just been recalled, and has the object of combining the advantages of these valves.

According to the invention, the valve comprises, in the direction in which the fluid flows, on one side a first basic valve sliding in a seat of revolution and having at least one V-shaped aperture whereof the flare of the V is directed towards the flow of fluid, and on the opposite side a second basic valve which is fast with the first and has a parabolic shape whereof the apex is turned towards the fluid inlet, each basic valve cooperating with a corresponding seat, and the axis of both valves being perpendicular to the direction in which the fluid enters.

The invention will now be described in greater detail, with reference to one particular form of embodiment which is given by way of example and illustrated in the drawings.

The single figure illustrates a valve according to the invention with its two seats, the valve being slightly lifted from the seats.

The valve according to the invention comprises, in the direction in which the fluid flows, on one side a first valve 1 which is V-shaped, and on the opposite side a second valve 2 of parabolic shape.

The first valve cooperates with a seat 3, and the parabolic valve 2 cooperates with a seat 4.

The valve 1 comprises apertures 5 in the shape of a V whereof the flare is directed towards the flow. When this basic valve 1 is lifted from its seat 3, it frees orifices in the shape of a V which become larger as lifting proceeds.

The basic valve 1 is thoroughly well guided in the bore 6 in which it slides, and does not undergo any oscillation.

The jets of fluid escaping from the valve 1 are recentered inside the body of the skirt; the jets taking the path of the seat 4 are distributed about the parabolic shape of the valve 2, ensuring that well-distributed throttling is imparted to the fluid as it passes over the seat 4.

The two basic valves 1 and 2 as a whole undergo practically no oscillation, the bearing surface of the basic valve 1 in its seat may be short, and there is no need to provide any additional guiding means on the side of the valve 1. As a result, the bulk and cost of the valve are reduced.

What I claim is:
1. Fluid regulator valve for regulation of fluid at high pressure comprising in the direction in which the fluid flows a central fluid receiving chamber, two opposed orifices in said chamber, a peripheral fluid discharge chamber receiving fluid through said orifices, a first basic cylindrical valve member sliding in a seat of revolution in one of said orifices, at least one V-shaped aperture in said first valve member, the flare of the V being directed toward said fluid discharge chamber, a second basic valve member fixed to said first valve member and having a parabolic shape, the apex of the parabola being directed toward said fluid receiving chamber, a valve seat for said second basic valve member in the other of said orifices and a control rod connected to said second basic valve member for axial movement of said valve members, said control rod passing through said fluid discharge chamber.

References Cited

UNITED STATES PATENTS

| | | | |
|---|---|---|---|
| 176,204 | 4/1876 | Shive | 137—625.34 |
| 630,627 | 8/1899 | McElroy | 137—625.3 |
| 1,693,273 | 11/1928 | Hankinson et al. | 137—625.34 X |
| 2,737,979 | 3/1956 | Parker | 137—625.34 |
| 3,123,091 | 3/1964 | Elsey. | |

ARNOLD ROSENTHAL, *Primary Examiner.*